United States Patent
D'Alvia

(10) Patent No.: US 6,766,983 B2
(45) Date of Patent: Jul. 27, 2004

(54) COCKPIT ACCESS PROTECTION SYSTEM

(76) Inventor: Graham R. D'Alvia, P.O. Box 12104, Charlotte, NC (US) 28220

( * ) Notice: Subject to any disclaimer, the term of this patent is extended or adjusted under 35 U.S.C. 154(b) by 0 days.

(21) Appl. No.: 10/299,136

(22) Filed: Nov. 19, 2002

(65) Prior Publication Data
US 2004/0094667 A1 May 20, 2004

(51) Int. Cl.⁷ ................................................ B64D 11/00
(52) U.S. Cl. .................................................... 244/118.5
(58) Field of Search ........................... 244/118.5, 118.1, 244/118.2, 118.6, 117 R, 138 R

(56) References Cited

U.S. PATENT DOCUMENTS

| | | |
|---|---|---|
| 3,704,845 A | 12/1972 | Ord |
| 5,694,867 A | 12/1997 | Diaz-Lopez |
| 5,701,828 A | 12/1997 | Benore et al. |
| 6,308,644 B1 | 10/2001 | Diaz |
| 6,474,599 B1 * | 11/2002 | Stomski .................... 244/118.5 |
| 2003/0052227 A1 * | 3/2003 | Pittman .................... 244/118.5 |
| 2003/0052798 A1 * | 3/2003 | Hanson ....................... 340/945 |
| 2003/0071743 A1 * | 4/2003 | Seah et al. .................. 340/945 |

* cited by examiner

Primary Examiner—Charles T. Jordan
Assistant Examiner—Stephen A. Holzen
(74) Attorney, Agent, or Firm—Milde & Hoffberg, LLP

(57) ABSTRACT

The cockpit access protection system relies upon pass codes for an aircraft and utilizes the galley area as a security area to verify a person's identity before allowing access to the cockpit. The system includes normal operation to ensure that unauthorized personnel do not gain access to the cockpit. Upon breach of security, the cockpit door is automatically locked by a computer on the ground. A false signal of security breach can be overcome by an authorized flight crew member communicating with ground control upon verification that the report of a false security breach is not made under duress. The system also allows emergency access to the cockpit in the event of a medical or other similar emergency.

24 Claims, 1 Drawing Sheet

COCKPIT ACCESS PROTECTION SYSTEM

FIELD OF THE INVENTION

The invention relates to a system for preventing unauthorized access to airplane cockpits.

BACKGROUND OF THE INVENTION

Safety of airplane crew and passengers often depends on preventing unauthorized access to the airplane cockpit. Presently, only a weak cockpit door separates the cockpit from the remainder of the aircraft. Preventing unauthorized personnel from gaining control of the cockpit prevents control of the aircraft from being turned over to unauthorized personnel.

The prior art discloses several methods for preventing unauthorized access. U.S. Pat. No. 6,308,644 (Diaz) discloses a control chamber security system having first and second doors defining an access control vestibule. Magnetic locks are provided on the doors and are controlled by a control panel. A video camera monitors the vestibule.

U.S. Pat. No. 5,701,828 (Benore et al.) discloses an electronic security system having a lock system controlling access to a plurality of enclosures. The lock mechanism has a specific access code allowing opening and closing of the locks on the door to each enclosure.

U.S. Pat. No. 3,704,845 (Ord) discloses an airplane hijacking prevention system preventing access to a cockpit by a door which can be opened only from the cockpit.

SUMMARY OF THE INVENTION

The cockpit access protection system relies upon pass codes for an aircraft and utilizes the galley area as a security area to verify a person's identity before allowing access to the cockpit. Upon breach of security, the cockpit door is automatically locked by a computer on the ground. A false signal of security breach can be overcome by an authorized flight crew member communicating with ground control upon verification that the report of a false security breach is not made under duress. The system also allows emergency access to the cockpit in the event of a medical or other similar emergency.

An aircraft cockpit security system has an aircraft cockpit, the cockpit having a cockpit door to grant access to the cockpit and a lock. A control center, remote from the aircraft cockpit, may be able to lock the cockpit door.

A system for securing a cockpit includes providing a cockpit door to block access to the cockpit and a galley door to form a galley. The galley may be located between the cockpit and the remaining portion of the aircraft. An indicator may be placed on the galley door to signal when the galley door is locked. Authorized personnel are allowed into said cockpit and the cockpit door is locked.

It is an object of the invention to provide a system for preventing non-flight personnel from entering the cockpit. It is another object of the invention to provide a cockpit security system that may be installed on any new or existing aircraft.

It is yet another object of the invention to enable pilots and other flight personnel to have use of the galley area of an aircraft under normal operating conditions.

It is still another object of the invention to provide pilots with a monitor to view activities outside the cockpit.

It is still another object of the invention to provide ground control with the ultimate authority to control cockpit access.

It is yet another object of the invention to allow for cockpit intervention by use of a security code in pilot medical emergencies or other similar hazardous situations.

It is yet another object of the invention to provide a system that operates to insure against human error, poor judgement, or human intervention actions driven by compassion.

These and other objects of the invention will become apparent to one of ordinary skill in the art after reading the disclosure of the invention.

DETAILED DESCRIPTION OF THE INVENTION

Figure 1:
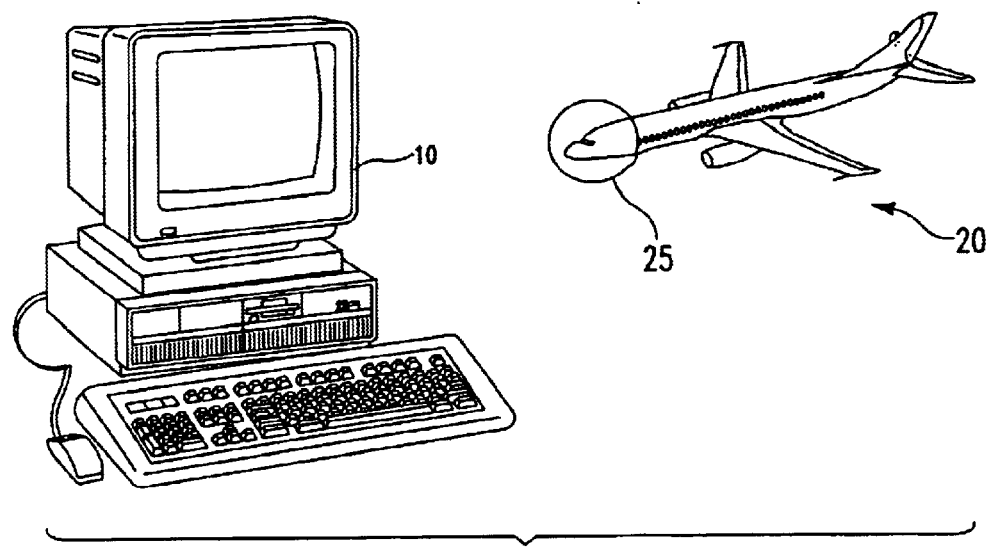
FIG. 1 is a view of the components of the invention.

With reference to FIG. 1, a remote computer 10 is depicted. This remote computer may be located on the ground, preferably in a highly secure area of FAA ground control. The remote computer communicates with the cockpit access protection system (CAPS) on an aircraft 20. The remote computer generates a concealed alphanumeric pass code unique for each aircraft. This code is communicated to authorize flight personnel to unlock the cockpit door in case of an emergency. A new code is generated for every flight when CAPS is activated and changes immediately upon a security breach on any other aircraft utilizing CAPS.

Figure 2:
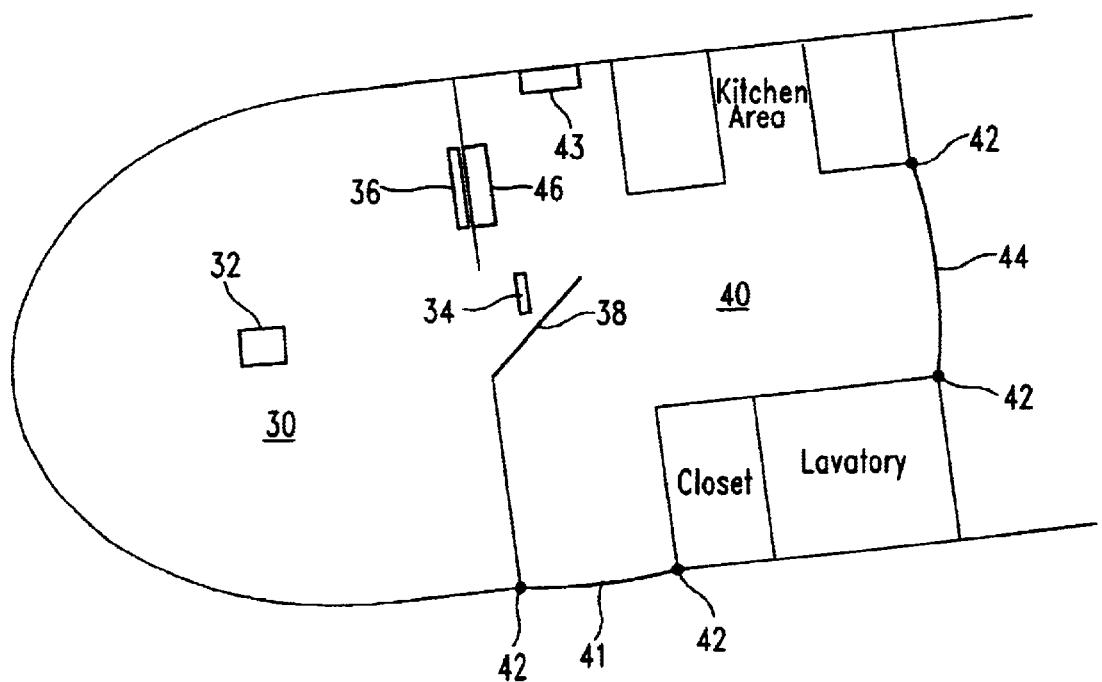
FIG. 2 is a drawing showing the components of the system within an aircraft cockpit and galley.

In the event of a security breach, the remote computer scrambles all pass codes for activated aircraft and sends a signal to the system aboard the aircraft experiencing the security breach to lock the cockpit door. Pilots on the aircraft experiencing the security breach cannot open the cockpit until ground control determines that it is safe to do so, or upon deactivation of CAPS. The CAP system may be located in the forward section 25 of the aircraft. The components comprising the CAP system are shown in FIG. 2. The forward end of the cockpit 25 is made from the cockpit 30 and galley area 40. A network node 36 may be located within the cockpit 30. The node communicates with and receives instructions from the remote computer located on the ground. The network node also receives the concealed alphanumeric pass code from the remote computer.

A reinforced cockpit door 38 separates the cockpit 30 from the galley area 40. Also, a galley door 44 having a locked/unlocked indicator light separates the galley area 40 from the passenger seating area. A main cabin door 41 provides an entrance and exit way between the galley and the exterior of the aircraft.

Sensors 42 are located on the main cabin door 41 and the galley door 44. The sensors on the main cabin door send the signal to the remote computer to activate CAPS when closed before departure and to deactivate CAPS upon arrival. The sensors on the galley door sends signals to the network node indicating whether the galley door is open or closed. The galley door 44 prevents access from the passenger area and allows the cockpit crew to use the facilities in the galley. When the cockpit door is open, the galley door remains closed and locked. The unlocked/locked indicator light shows crew members when the galley door is locked or unlocked.

A keypad 46 having a CAPS light may be located on the bulkhead of the galley next to the cockpit door 38. The indicator light shows crew members when CAPS is activated or deactivated. The keypad is used by the flight crew to log on to the flight by entering individual social security numbers or other identification numbers. The flight crew must successfully log on before CAPS is activated. The keypad unlocks the cockpit door in case of a pilot or medical emergency or other hazardous situation as will be described later. A two-way radio 48 is also located in the galley. The two-way radio is installed near the keypad and is used for voice communication between the aircraft and ground control.

A camera 34 connected to monitor 32 within the cockpit allows pilots to view events occurring outside the cockpit to visually determine if any potential safety issues exist. During a security breach, the camera records and sends a live video feed to a monitor at ground control.

With the components of the system described, the operation of the system will now be detailed.

After loading of the passengers and before departure of the flight, the CAPS is activated. Upon entering the aircraft, the flight personnel log on to the flight by entering an identification number, such as a social security number or an employee ID on the keypad. The information is sent to the central processor unit for the specific airline. The numbers entered by the flight crew are verified against the personnel scheduled to work that particular flight. The flight captain completes the standard departure checklist and the main cabin door is closed. The sensor on the main cabin door triggers the network node 36 to send a signal to the remote computer 10. The remote computer 10 scrambles the existing pass codes for that aircraft and then generates and files a new, encrypted pass code. At this point, the remote computer activates CAPS for the aircraft.

During flight, the pilot views the monitor 32 to ensure that the galley area 40 is clear and contacts the flight attendant to secure the galley door 44. Once the galley door 44 is closed and locked, sensors on the galley door send a signal to the node 36 indicating the locked condition. The pilot then may open the cockpit door 38. After exiting, the cockpit door is locked and closed. Once in the galley are 40, the pilot is free to use the facilities in the galley. When the pilot wishes to return to the cockpit, the pilot notifies the copilot within the cockpit. The copilot inside the cockpit views the cockpit monitor 32 to insure that the galley area 40 is secure. The copilot releases the lock on the cockpit door 38 and the pilot in the galley 40 enters the cockpit 30 and closes the cockpit door 38. The cockpit door 38 automatically locks. The pilot signals a flight attendant that it is now safe to open the galley door 44. When opened, sensors 42 on the galley door 44 send a signal to the node 36 indicating the open condition of the galley door 44.

Upon a security breach, the remote computer 10 scrambles all pass codes for CAPS activated aircraft. Also, the remote computer 10 sends a signal to the node 36 located on the aircraft experiencing the security breach of a locked cockpit. Security breach can occur under such conditions as the galley door 44 and cockpit door 38 being opened simultaneously. Pilots on the aircraft experiencing a security breach cannot open the cockpit until the ground control determines that it is safe to do so or upon deactivation of CAPS.

In the event of a false security breach, an authorized flight personnel contacts ground control through the two-way radio 48. The crew member must explain the events causing the false security breach and request that the auto-lock of the cockpit door 38 be released. Ground control must verify that the individual is both authorized and not acting under duress. Ground control is able to view the galley area through the video feed of the camera 34. Ground control must complete a checklist to verify that no security threat exists before releasing the auto-lock of the cockpit door 38. Only ground control can release the auto-lock on the cockpit door that is initiated by a security breach.

There is a mechanism for emergency access to a cockpit. This procedure is conducted only when there is an emergency situation putting the pilots in a potentially hazardous situation or when the connection between the aircraft node 36 and remote computer 10 is broken and for that reason the auto-lock on the cockpit door 38 cannot be overridden. For the emergency access, an authorized crew member contacts ground control to alert ground personnel of the situation and request the pass code. Ground control must verify that the individual is authorized and not acting under duress. Upon doing so, ground control provides a pass code to the authorized crew member. The crew member enters the pass code onto the keypad 46 allowing the crew member to open the cockpit door and to remedy the emergency situation. When an emergency condition occurs, all codes of all other aircraft are automatically reset.

Upon arrival, CAPS is deactivated by the captain completing a standard arrival checklist. When the main cabin door 41 opens, the sensors on the cabin door trigger to node 36 to send a signal to the remote computer. The nodes send the signal. This signal deactivates CAPS on the aircraft and the remote computer scrambles the existing pass code for the aircraft and deactivates CAPS for the aircraft.

While the invention has been described with reference to the preferred embodiment, variations and modifications would be apparent to one of ordinary skill in the art without departing from the scope of the invention. Therefore, the claims are to be liberally construed to encompass such modifications and variations.

What is claimed is:

1. An aircraft having a cockpit security system, comprising:
   an aircraft cockpit, said cockpit having a cockpit door to grant access to the cockpit, said cockpit door having a lock;
   a control center remote from said aircraft, said control center providing an alphanumeric code to said aircraft and being able to operate said lock on said cockpit door, in the event of a security breach, to automatically lock said cockpit door;
   a network node in said aircraft for communicating with said control center to receive said alphanumeric code and instructions for locking said cockpit door;
   a keypad, located in said aircraft and coupled to said network node, for entering flight crew identification information and said alphanumeric code;
   said network node being responsive to the receipt of said alphanumeric code from the keypad for unlocking said cockpit door.

2. The security system of claim 1, further comprising a camera mounted in said aircraft outside of said cockpit.

3. The security system of claim 2, wherein images from said camera are viewable from said control center.

4. The security system of claim 2, further comprising a monitor in said cockpit, said monitor linked to said camera for viewing images from said camera.

5. The security system of claim 1, further comprising:
   a galley area of said aircraft located outside of said cockpit, and
   a galley door separating said galley area from the remaining cabin area of said aircraft.

6. The security system of claim 5, further comprising sensors on located in the vicinity of said galley door indicating whether the galley door is opened or closed.

7. The security system of claim 6, further comprising a light in the cabin area indicating the locked condition of the galley door.

8. The security system of claim 7, wherein said light is red when the galley door is locked and green when the galley door is unlocked.

9. The security system of claim 1, further comprising a an aircraft exterior door located outside of said cockpit, said door leading to the exterior of the aircraft, and sensors located in the vicinity of said door for indicating whether the exterior door is opened or closed.

10. The security system of claim 1, further comprising a two-way radio located in the cabin area of said aircraft outside of said cockpit for providing communication between aircraft personnel and personnel at said control center.

11. A method for securing an aircraft cabin having a cockpit and a galley, adjacent to said cockpit, said method comprising the steps of:

provding a lockable cockpit door to block access to the cockpit from the remaining portion of the aircraft cabin;

providing a lockable galley door to block access to the galley from the remaining portion of the aircraft cabin;

placing a sensor in the vicinity of said galley door to signal when said galley door is locked;

allowing authorized personnel into said cockpit and locking said cockpit door;

locking said galley door, and unlocking said cockpit door and allowing authorized personnel into the galley from the cockpit when said sensor confirms that said galley door is locked;

assigning an alphanumeric code to the aircraft;

storing said code on a network node on said aircraft; and unlocking said cockpit door upon entry of said alphanumeric code in a keypad coupled to said network node.

12. The method of claim 11, further comprising the step of locking the cockpit door after said authorized personnel have left the cockpit.

13. The method of claim 12, further comprising the step of conducting a visual inspection of said galley before allowing said authorized personnel to reenter the cockpit.

14. The method of claim 13, further comprising the step of sending a signal to flight attendants that it is allowable to unlock the galley door after said authorized personnel have reentered the cockpit and the cockpit door has been locked.

15. The method of claim 11, further comprising a light for indicating the locked condition of said galley door.

16. The method of claim 11, further comprising said sensor the steps of sending a signal to said network node in said cockpit aircraft indicating when at least one of said cockpit door and said galley door is locked.

17. The method of claim 11, further comprising the step of verifying the identities of the authorized personnel before allowing said authorized personnel to reenter the cockpit.

18. The method of claim 11 comprising the step of generating said alphanumeric code in a control center remote from the aircraft and transmitting said code to said aircraft.

19. The method of claim 11 further comprising the step of scrambling said alphanumeric code in the event of a security breach.

20. The method of claim 11, further comprising the step of scrambling said codes for all aircraft in the event of a security breach.

21. The Method of claim 20, further comprising the step of allowing the unlocking of said cockpit door after verifying no security breach exists.

22. The method of claim 11, further comprising the step of preventing the unlocking of the cockpit door in the event of a security breach.

23. The method of claim 22, further comprising the step of verifying that no security breach exists by communicating with a control center remote from said aircraft.

24. The method of claim 11, further comprising the step of entering flight crew identification numbers on a keypad before assigning said code.

* * * * *